(12) United States Patent
Monty et al.

(10) Patent No.: US 6,279,323 B1
(45) Date of Patent: Aug. 28, 2001

(54) LOW EMISSIONS COMBUSTOR

(75) Inventors: Joseph D. Monty, Boxford; John C. Jacobson, Melrose, both of MA (US)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 09/431,464

(22) Filed: Nov. 1, 1999

(51) Int. Cl.$^7$ ...................................... F02G 3/00
(52) U.S. Cl. .................. 60/752; 60/748; 60/732
(58) Field of Search .................. 60/752, 39.32, 60/748, 732

(56) References Cited

U.S. PATENT DOCUMENTS

| | | | |
|---|---|---|---|
| 4,315,405 | * 2/1982 | Pidcock et al. | 60/752 |
| 4,689,961 | * 9/1987 | Stratton | 60/748 |
| 5,002,483 | * 3/1991 | Becker | 60/732 X |
| 5,117,637 | * 6/1992 | Howell et al. | 60/748 |
| 5,490,378 | 2/1996 | Berger et al. | 60/39.23 |
| 5,937,653 | 8/1999 | Alary et al. | 60/748 |
| 5,970,716 | * 10/1999 | Forrester et al. | 60/39.32 X |
| 6,035,645 | * 3/2000 | Bensaadi et al. | 60/748 X |
| 6,070,412 | * 6/2000 | Ansart et al. | 60/752 X |
| 6,101,814 | * 8/2000 | Hoke et al. | 60/752 |

FOREIGN PATENT DOCUMENTS

678708A2   10/1995  (EP).

OTHER PUBLICATIONS

General Electric Company, "CF34–3A1 Combustor," on sale more than one year, single drawing sheet.
General Electric Company, "CF6–80LEC Combustor," on sale more than one year, single drawing sheet.
J.D. Monty et al, US Patent application Serial No. 09/431,465, filed concurrently herewith, and entitled "Offset Dilution Combustor Liner," (Docket 13DV–13020).

* cited by examiner

*Primary Examiner*—Timothy S. Thorpe
*Assistant Examiner*—David J. Torrente
(74) *Attorney, Agent, or Firm*—Andrew C. Hess; Rodney M. Young

(57) ABSTRACT

A combustor includes outer and inner liners joined at one end to an annular dome. A swirl cup is mounted to the dome and includes a flare cone extending therethrough. The flare cone has an obtuse flare angle for discharging fuel in a wide spray from an outlet of the cone. A flared heat shield surrounds the cone, and extends in part aft from the cone outlet, and is offset in part forwardly from the cone outlet to define a radially outwardly facing step.

20 Claims, 3 Drawing Sheets

LOW EMISSIONS COMBUSTOR

CROSS REFERENCE TO RELATED APPLICATION

The present invention is related to U.S. patent application Ser. No. 09/431,465, filed concurrently herewith by J. D. Monty et al, and entitled "Offset Dilution Combustor Liner."

BACKGROUND OF THE INVENTION

The present invention relates generally to gas turbine engines, and, more specifically, to combustors therein.

In a gas turbine engine, air is pressurized in a compressor and mixed with fuel in a combustor for generating hot combustion gases. Energy is extracted from the combustion gases in turbine stages which power the compressor and produce useful work such as powering a fan disposed upstream of the compressor.

A turbofan engine operates over various power levels at idle, takeoff, and cruise and is designed to maximize efficiency for reducing fuel consumption and undesirable exhaust emissions.

Typical exhaust emissions include smoke, unburned hydrocarbons, carbon monoxide (CO), and nitrogen oxides (NOx). Due to the complex nature of combustion, and due to the limited space available in typical combustors, many compromises must be made in combustor design for achieving acceptable performance for particular engine designs and power ratings.

The prior art is quite crowded with various types of gas turbine engine combustors with myriad configurations thereof for maximizing performance or minimizing emissions with practical combustor life or durability.

A typical single annular combustor includes radially outer and inner combustion liners joined at forward ends to an annular dome and spaced apart at aft ends to define an annular outlet for discharging combustion gases to the turbines. The dome includes a plurality of circumferentially spaced apart carburetors each including a fuel injector and cooperating swirler or swirl cup. Various designs are found for the feel injectors and the swirlers.

A typical swirler supports a fuel injector tip and mixes with the fuel therefrom compressed air typically swirled in counter-rotating streams therearound. Air swirling is typically effected by rows of inclined swirl vanes or inclined air holes formed in the body of the swirl cup.

A fuel and air mixture discharged from each carburetor into the combustor undergoes combustion therein which liberates substantial heat. The various components of the combustor are protected from this beat by diverting a portion of the pressurized air for use as cooling air.

A typical combustion liner is formed of annular panels axially joined together at corresponding film cooling nuggets which create a film of cooling air along the inner surface of the combustor bounding the combustion gases therein.

Air is also channeled through the dome for cooling thereof. The dome is additionally cooled by providing corresponding heat shields or baffles around each of the swirlers which pass through the dome to provide a barrier against the hot combustion gases. The heat shields are cooled by holes in the dome which impinge air thereon. The spent impingement air then flows along the heat shields for discharge into the combustor.

Each swirler also includes an outlet in the form of a flare cone at its aft end which protrudes through a corresponding heat shield. The included flare angle of the cone controls the corresponding spray angle of the fuel and air mixture from each of the carburetors.

Since the flare cones are directly exposed to the combustion gases, they are subject to heating therefrom. To prevent burning of the flare cone, air may be channeled between the aft side of the heat shield and the front side of the flare cone for providing convection cooling thereof, with the spent air being discharged into the combustor. Combustors including this type of flare cone cooling have been sold in this country for many years. However, this type of flare cone cooling has been found to be a source of hydrocarbon and CO emissions, which are undesirable under more stringent emission requirements.

Another combustor enjoying many years of successful commercial use in this country avoids this emission problem by eliminating air cooling of the flare cone and instead integrating the heat shield with the aft end of the flare cone in one casting. However, the interface between the flare cone and the integral heat shield provides a structural discontinuity for the different functions thereof, and the integrated component is subject to substantial temperature gradient from relatively cool in the flare cone to relatively hot at the aft end of the heat shield exposed to the combustion gases. The large temperature gradient and geometric discontinuity create substantial thermal stress during operation which correspondingly reduces the effective life of the components.

Other types of combustors enjoying years of successful commercial use in this country use an acute flare cone angle of up to about 90° to maintain a narrow angle fuel spray increasing the spacing from the heat shields. The intent of the narrow spray angle is to direct the unburned fuel away from the liner walls to minimize unburned hydrocarbon and CO emissions. In addition, the narrow spray draws hot combustion gas from the downstream area into close contact with the beat shield, increasing the above mentioned temperature gradient However, this solution is not practical on relatively small combustors since altitude restarting is severely compromised.

Accordingly, it is desired to provide an improved combustor having reduced exhaust emissions and suitable durability.

BRIEF SUMMARY OF THE INVENTION

A combustor includes outer and inner liners joined at one end to an annular dome. A swirl cup is mounted to the dome and includes a flare cone extending therethrough. The flare cone has an obtuse flare angle for discharging fuel in a wide spray from an outlet of the cone. A flared heat shield surrounds the cone, and extends in part aft from the cone outlet, and is offset in part forwardly from the cone outlet to define a radially outwardly facing step.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
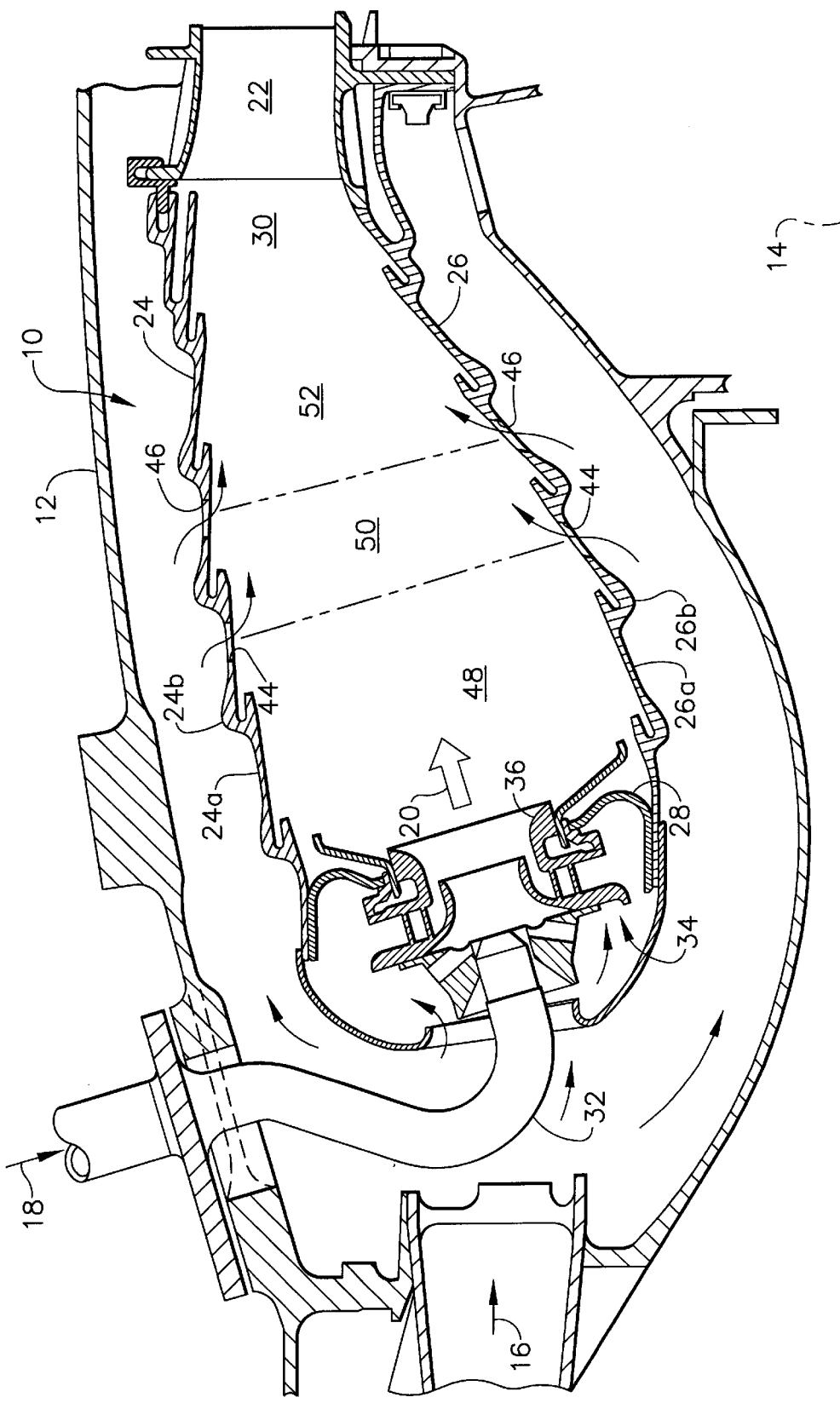
FIG. 1 is an axial sectional view through a portion of annular combustor in accordance with an exemplary embodiment of the present invention.

Illustrated in FIG. 1 is a single annular combustor 10 disposed inside an annular casing 12 in a turbofan gas turbine aircraft engine. The combustor is axisymmetrical about a longitudinal or axial centerline axis 14 and receives pressurized air 16 from a compressor (not shown) which is mixed with fuel 18 and ignited for generating hot combustion gases 20 which are discharged from the combustor into conventional turbine stages including a high pressure turbine nozzle 22.

The combustor includes radially outer and inner annular combustion liners 24,26 joined at forward ends thereof to an annular dome 28, and spaced radially apart at aft ends thereof to define an annular combustor outlet 30.

A plurality of circumferentially spaced apart carburetors are suitably mounted through the dome, with each including a conventional fuel injector 32 and a cooperating air swirler or swirl cup 34. Each swirl cup is suitably mounted to the dome for coaxially receiving a respective fuel injector, and is configured for swirling and mixing air with fuel from the injector for generating a fuel and air mixture which is burned inside the combustor.

But for the present invention, the fuel injector 32 and cooperating swirler 34 may have any conventional configuration.

For example, the fuel injector 32 preferably has dual orifice discharge nozzle with primary and secondary fuel circuits. The inner primary fuel circuit is sized for idle operation, and the outer secondary circuit is sized for high power operation for hydraulic atomization of the fuel inside the swirler.

Figure 2:
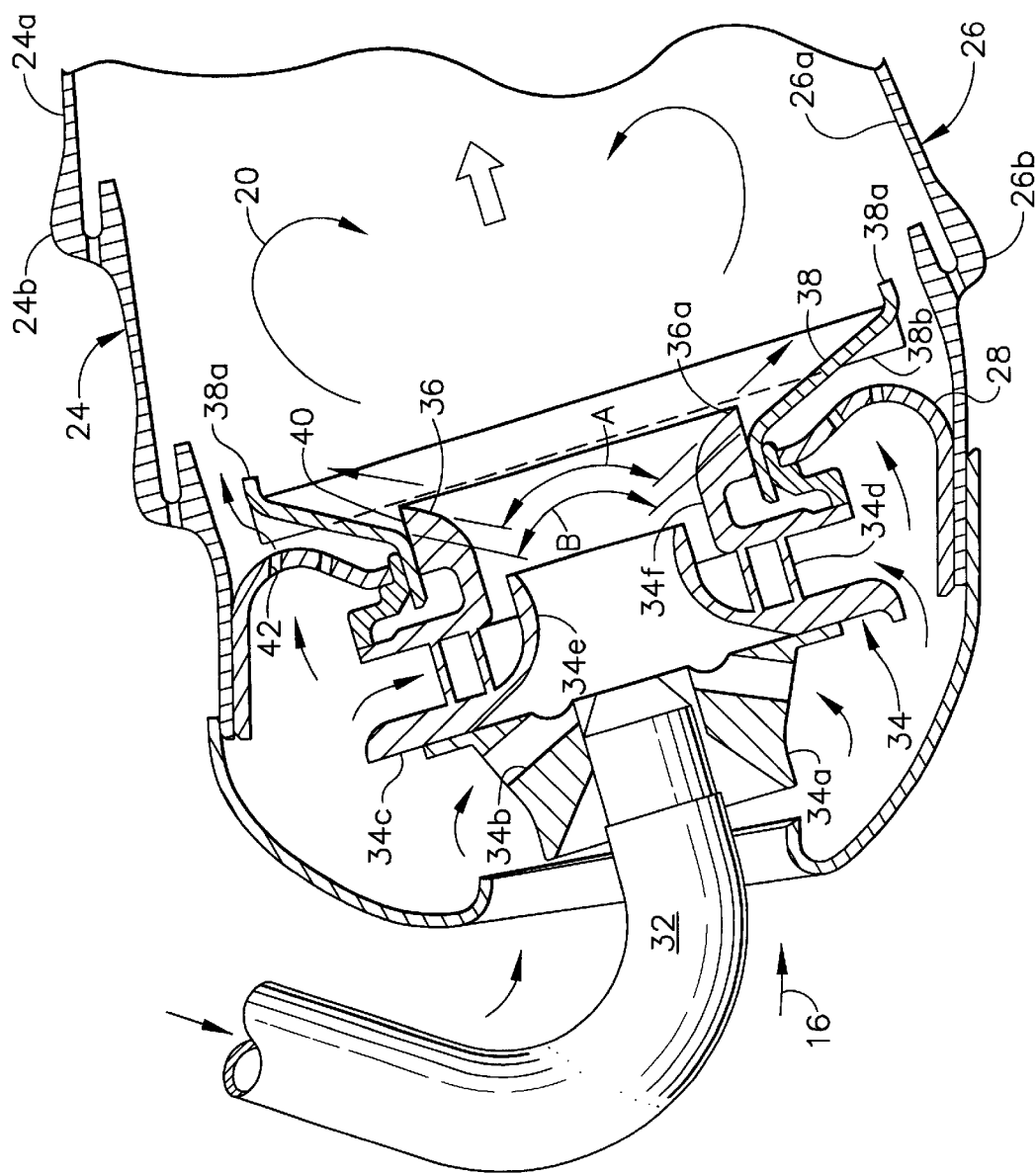
FIG. 2 is an enlarged, partly sectional view of the dome end of the combustor illustrated in FIG. 1.

As illustrated in FIG. 2, the swirler 34 includes a tubular ferrule 34a which receives the tip of the fuel injector, and includes a row of drilled holes 34b which are axially and circumferentially inclined to swirl primary air in one rotary direction concentrically around the fuel discharged from the injector.

The swirler also includes a cast tubular body 34c having a row of circumferentially inclined secondary swirl vanes 34d which swirl additional air radially inwardly for discharge axially aft concentrically around the injected fuel and primary swirl air. The swirler body 34c also includes a primary venturi 34e disposed coaxially with the fuel injector and ferrule, and a cooperating secondary venturi 34f disposed coaxially with the primary venturi and spaced radially outwardly therefrom for receiving the secondary swirl air therebetween.

The swirler body 34c is fixedly joined to the combustor dome 28, and the ferrule 34a is joined to the body in a conventional manner for permitting differential radial sliding movement therebetween during operation.

As above described, the injector and swirl cup are conventional in configuration and operation for injecting fuel coaxially inside the swirler and mixing therewith air which is swirled with counter-rotation for producing a fuel and air mixture for undergoing combustion.

In accordance with a preferred embodiment of the present invention, the swirl cup 34 illustrated in FIG. 2 includes a tubular flare cone 36 integrally formed with the secondary venturi 34f in a common casting, for example. The flare cone extends axially through a corresponding aperture in the combustor dome 28. The flare cone has an obtuse discharge flare angle A for discharging the fuel and air from the swirler in a correspondingly wide spray from the outlet 36a at the aft end of the flare cone.

Suitably attached to the dome 28 is a flared heat shield 38 locally surrounding each of the flare cones 36 of each of the swirlers 34 around the circumference of the combustor dome. The heat shield 38 is preferably a fabricated sheet metal component which extends in most or major part aft from the flare cone outlet 36a, and is offset in minor part forwardly from the cone outlet 36a to define a radially outwardly facing annular step 40 circumferentially around the outer perimeter of the flare cone at its outlet end.

Figure 3:
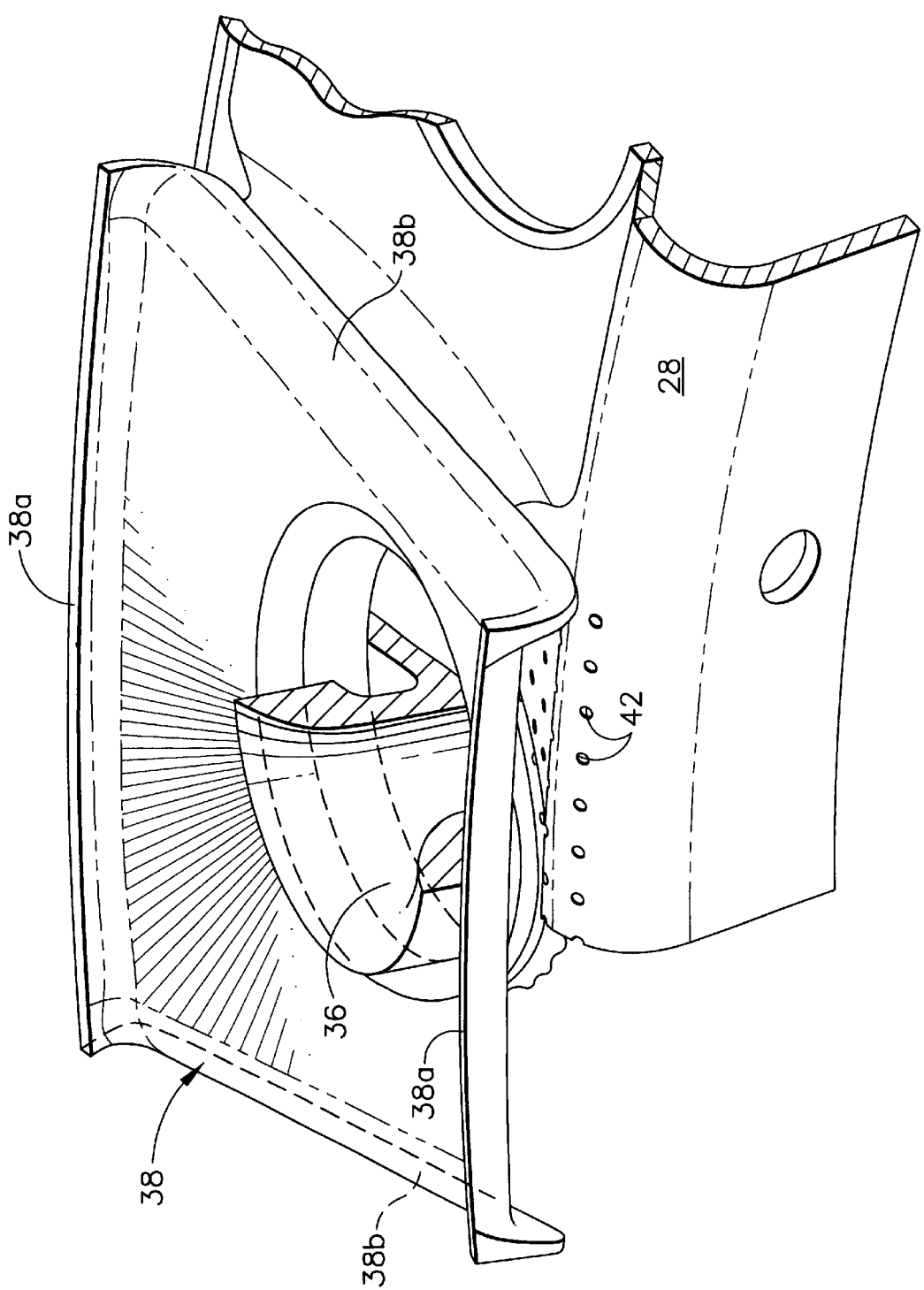
FIG. 3 is an isometric view of a portion of the combustor dome illustrated in FIG. 2 having a cooperating flare cone and heat shield in accordance with an exemplary embodiment of the present invention.

The heat shield 38 has a tubular inlet end which is suitably attached inside the dome aperture, by brazing or welding for example. The heat shield flares radially outwardly from the flare cone toward the outer and inner liners to shield the combustor dome from the hot combustion gases 20 generated during operation. The heat shield also extends circumferentially in opposite directions from swirler to swirler as shown in FIG. 3, with the collective circumferential extent of the several heat shields protecting the combustor dome circumferentially inside the combustor.

In the preferred embodiment illustrated in FIG. 2, the heat shield 38 has an obtuse flare angle B and diverges at least as much as the coaxial flare cone 36.

Furthermore, the flare cone 36 and heat shield 38 are preferably imperforate at the step 40 in axial section to prevent airflow to the step 40.

The flare cone 36 and the heat shield 38 are preferably two discrete components unattached to each other at the step 40 to permit unrestrained differential thermal movement therebetween during operation. The heat shield 38 is fixedly attached to the combustor dome inside the corresponding aperture therethrough, and the swirler body 34c is fixedly attached to the combustor dome outboard of the secondary swirl vanes 34d, with the secondary venturi 34f and integral flare cone 36 extending axially through the tubular bore of the heat shield inlet The dome and heat shield are cooled in a conventional manner by providing rows of impingement holes 42 through the dome which direct the pressurized air in impingement against the forward side of the heat shield. This air then flows aft along the heat shield for discharge into the combustor.

The combustor illustrated in FIGS. 1 and 2 is an improved, larger version of a single annular combustor commercially used in this country for many years. It is sized larger for increasing power from the corresponding engine. However, the larger combustor has a higher altitude starting requirement and is subject to more stringent exhaust emissions requirements. Mere scaling of the combustor to a larger size is insufficient for meeting these requirements.

Furthermore, the original swirler in the commercial engine includes a sheet metal flare cone extending generally parallel to a cooperating sheet metal heat shield, with both extending coextensively radially outwardly from the centerline of the swirler with corresponding flare angles. Cooling air is injected between the heat shield and flare cone for cooling the flare cone.

As indicated above in the Background section, the introduction of cooling air on the front side of such a flare cone is a source of hydrocarbon and CO emissions which are unacceptable in the growth combustor. And, the higher altitude starting requirement further complicates the design of the growth combustor.

In accordance with the preferred embodiment illustrated in FIG. 2, the flare cone 36 is radially truncated relative to the heat shield 38 and terminates at the base of the flared heat shield to define the step 40 therebetween. The flare cone 36 is cast with the common swirler body 34c for strength and increased durability, and is preferably a separate component from the surrounding heat shield 38.

The flare cone and heat shield are assembled so that the cone outlet 36a protrudes aft of the heat shield to effect the step 40. And, no apertures are provided in the region of the step for providing cooling air thereto. The step 40 is thusly devoid of cooling air for elminating undesirable hydrocarbon and CO exhaust emissions produced in the conventional design The obtuse flare angle A of the flare cone provides a wide spray of fuel from the swirler which attaches to the aft surface of the heat shield 38 during operation. The attached spray prevents hot gas recirculation around the step 40 for substantially reducing metal temperatures thereat during operation. The gases surrounding the step 40 during operation are fuel rich, mostly unburned, and relatively cool, and thusly increase durability and life of this portion of the combustor. The wide spray from the flare cone also reduces unburned hydrocarbon emissions during operation, and additionally improves altitude starting.

In the preferred embodiment illustrated in FIG. 2, the flare angles A,B of both the flare cone 36 and heat shield 38 are preferably greater than about 110°, and preferably about 120°. In this way, a wide spray pattern is effected for attachment to the heat shield for the advantages described above.

The combustor illustrated in FIG. 1 is relatively small for powering a small turbofan engine in the 9,000–18,000 pound thrust range. In larger single annular combustors as indicated above, relatively narrow and acute flare cone angles are used for proper operation of the combustors. However, in a small combustor such as the one illustrated in FIG. 1, narrow spray severely compromises altitude starting and is thusly undesirable.

The wide spray operation of the swirler shown in FIG. 1 not only increases altitude starting capability in the small combustor, but cooperates with the step 40 and heat shield for maintaining attachment of the gas mixture from the swirlers along the heat shield for reducing exhaust emissions while providing a cooling mechanism in this region. The step 40 illustrated in FIG. 2 is sufficiently small for permitting gas discharge from the flare cone to attach to the heat shield, as well as stabilizing the flow attachment thereto.

An additional advantage of the separate, but cooperating flare cone 36 and heat shield 38 is the substantial reduction in thermally generated stress during operation. During operation, a substantial temperature gradient is effected along the secondary venturi 34f to the flare cone 36 at the aft end thereof and along the beat shield 38. The heat shield 38 is relatively hot as compared with the flare cone 36.

By mechanically separating or uncoupling the heat shield from the flare cone, differential thermal movement between these two components is permitted which substantially relieves thermal stress. Furthermore, the geometric discontinuity provided at the step 40 is not found in a single component which would effect an undesirable stress concentration, but is found between the two components thusly eliminating such a stress concentration.

The heat shield 38 may be conventionally formed from stamped sheet metal having fast thermal response during operation. The flare cone 36 is preferably cast with the common swirler body 34c for increasing its strength and durability.

If desired, the heat shield 38 could be integrally cast with the swirl cup body 34c and flare cone 36 but would not enjoy the thermal stress advantages attributable to two discrete components. Nevertheless, the configuration would enjoy reduced exhaust emissions and additional enhanced performance of the combustor as further described hereinbelow.

As illustrated in FIG. 3, the heat shield 38 includes an aft perimeter or boundary having radially opposite outer and inner circumferentially extending border edges 38a, and circumferentially opposite, radially extending lateral edges 38b having a generally rectangular configuration. The lateral edges 38b are preferably arcuate or rolled forward to adjoin the combustor dome 28 and restrict airflow therebetween.

Correspondingly, the border edges 38a are arcuate or rolled aft toward the corresponding outer and inner liners 24,26, as additionally illustrated in FIG. 2

The heat shield 38 thusly combines both rolled border and lateral edges, which rolled edges are conventional in double annular combustors, but not previously applied in a single annular combustor of the type illustrated in FIG. 1.

The rolling of the lateral edges 38b restricts or prevents cooling air discharge along those edges circumferentially between adjacent swirl cups, and instead directs all or most of the spent impingement cooling air in two paths radially outwardly to the outer liner 24 and radially inwardly to the inner liner 26. This feature in combination with the flare cone step 40 provides significant improvement in altitude starting, and a significant reduction in unburned hydrocabon emissions.

And, the rolled border edges 38a better direct the spent impingement air along the corresponding outer and inner liners 24,26 to provide additional film cooling thereof.

These improvements in combination provide yet further improvements in the overall combustor in a synergistic manner.

More specifically, each of the outer and inner combustor liners 24,26 illustrated in FIGS. 1 and 2 is preferably formed of annular panels or segments 24a,26a axially joined together at corresponding film cooling nuggets 24b,26b in a conventional manner. Each nugget includes one or more rows of film cooling holes which channel the pressurized air 16 as films along the inside surface of the liners exposed to the combustion gases.

As shown in FIG. 1, each liner is preferably formed of five axially adjoining panels 24a,26a which is one more panel than found in the conventional combustor over which the present invention is an improvement in larger size. The second and third panels 24a,26a of the two liners aft from the dome 28 include first and second respective rows of dilution holes 44,46 which inject into the combustor substantial portions of the pressurized air 16 for diluting the combustion gases generated therein.

The two rows of dilution holes 44,46 illustrated in FIG. 1 divide the combustor into a primary combustion zone 48 between the dome 28 and the first dilution row, an intermediate zone 50 axially between the first and second dilution rows, and an aft zone 52 axially between the second dilution row and the combustor outlet 30.

Dilution holes are conventionally found in combustors in various configurations. However, the combustor illustrated in FIG. 1 preferably has five liner panels which is one more than the conventional combustor over which the present combustor is an improvement. In the original combustor, the dilution holes are positioned in the second and third liner panels with there being only single liner panels upstream therefrom and downstream therefrom That combination affects the overall performance of the combustor.

In FIG. 1, the dilution holes are also positioned in the second and third liner panels, but the combustor has a larger volume, and includes two liner panels aft of the second dilution row which significantly alters the relative sizes of the three combustion zones.

In the preferred embodiment illustrated in FIG. 1, the primary zone 40 is sized to have the maximum burning volume of the three zones, and the intermediate zone 50 is sized to have the minimum volume. The primary zone 48 cooperates with the row of swirl cups 34 in the dome 28 for receiving combustor air primarily only therefrom.

The placement of the first dilution row at the second liner panels provides a relatively large primary burning volume which minimizes entrainment of first row dilution air into the primary zone. This works in concert with the above described wide spray distribution from the row of swirl cups.

Flow visualization shows that the plane of the dilution air introduction is at the aft boundary of the recirculation combustion gas bubble formed by the swirler flow. Air for primary combustion is almost entirely provided by the swirler air. Heat shield cooling air has minimal contribution by virtue of it being directed along the liners by the preferred rolled heat shield configuration.

The counter-rotating swirl cups 34 mix well the fuel and air for allowing acceptable levels of smoke despite a relatively rich condition in the primary zone at takeoff power. The homogeneous rich mixture in the primary zone also suppresses NOx formation therein.

Swirler airflow is preferably set to provide near stoichiometric conditions in the primary zone at ground idle settings to minimize emissions of CO and unburned hydrocarbons. At high power, the primary zone runs sufficiently rich to suppress NOx formation.

The first row of dilution holes 44 is preferably sized to dilute the combustion gases to a slightly lean condition or equivalence ratio at high power to maximize CO burnout.

The second row of dilution holes 46 is close coupled to the first row by being disposed in the next downstream liner panel and is sized to provide rapid quenching of the lean combustion gases to minimize NOx formation. The configuration of the combustor illustrated in FIG. 1 thusly provides the many benefits of a rich-lean-quick quench combustor providing low NOx and CO emissions, but not at the expense of altitude starting requirements.

The primary zone 48 may be operated fuel rich to the degree which allows acceptable levels of smoke. The intermediate zone 50 in which dilution air is first injected transitions the combustion gases from rich to lean and is a region of NOx formation. The aft zone 52 is the final mixing zone of the dilution air with the combustion gases prior to entering the turbine. By minimizing the volume of the intermediate zone 50 and maximizing the volume of the aft zone 52, NOx formation can be substantially reduced.

The improved flare cone 36 and heat shield 38 combination described above provide yet further benefits. The primary combustion zone 38 may be operated relatively rich, with rich, primarily unburned gases attaching to the heat shield 38 during operation for providing effective cooling thereof while minimizing exhaust emissions. The spent impingement air from the heat shields is directed to the first liner panels to provide additional cooling thereof. This increased cooling effectiveness of the spent heat shield cooling air improves durability of the first liner panel, and reduces the cooling air requirement therefor from the film cooling nuggets. The reduced cooling air from the first cooling nugget further reduces emissions of CO and unburned hydrocarbons.

The wide angle flare cone 36 and forward rolled heat shield border edges 38a not only increase the altitude starting ceiling, but improve performance of the combustor. Accordingly, for a given power rating of the combustor, it may be configured with a smaller burning volume for a unit airflow than otherwise possible. This relatively smaller burning volume reduces residence time for the combustion gases therein and reduces NOx emissions. The correspondingly smaller overall combustor size made possible by the reduced burning volume also requires less airflow for dome and liner cooling, which further reduces CO emissions and unburned hydrocarbons, while maintaining acceptable liner life and combustion gas exit temperature distribution in the circumferential pattern factor and radial profile factor.

Accordingly, the re-configuration of an otherwise conventional swirl cup to include the wide angle flare cone 36 and cooperating heat shield 38 having the step 40 therebetween permits substantial improvement in single annular combustor design in a small combustor not otherwise possible. The combustor illustrated in FIGS. 1–3 additionally includes otherwise conventional components in a new and synergistic combination for enhancing combustor performance with relatively high altitude starting capability, with reduced exhaust emissions, and with enhanced durability and life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A gas turbine engine combustor comprising:
    radially outer and inner annular liners joined at forward ends to an annular dome and spaced radially apart at aft ends to define an annular outlet;
    a swirl cup mounted to said dome and including a flare cone extending through said dome with an obtuse first flare angle for discharging fuel in a wide spray from an outlet thereof;
    a flared heat shield having a tubular inlet end surrounding said flare cone and extending in major part aft from said outlet thereof with an obtuse second flare angle offset forwardly from said first flare angle at said cone outlet to define a radially outwardly facing step protruding said cone outlet axially aft from said heat shield between said first and second cone angles thereof; and
    said flare cone and heat shield being discrete components unattached at said step to permit unrestrained differential movement therebetween.

2. A combustor according to claim 1 wherein said heat shield has an obtuse flare angle.

3. A combustor according to claim 2 wherein said heat shield diverges at least as much as said flare cone.

4. A combustor according to claim 3 wherein flare angles of both said flare cone and heat shield are greater than about 110°.

5. A combustor according to claim 4 wherein said flare angles of both said flare cone and heat shield are about 120°.

6. A combustor according to claim 2 wherein said flare cone and heat shield 38 at said step are imperforate in section to prevent airflow to said step.

7. A combustor according to claim 2 wherein said flare cone and heat shield are parallel and axially offset from each other along said first and second flare angles.

8. A combustor according to claim 2 wherein said heat shield includes an aft perimeter having radially opposite border edges, and circumferentially opposite lateral edges, and said lateral edges are rolled forward to adjoin said dome and restrict airflow therebetween.

9. A combustor according to claim 8 wherein said heat shield border edges are rolled aft toward said outer and inner liners.

10. A combustor according to claim 2 wherein:

each of said outer and inner liners includes five annular panels, axially joined together at film cooling nuggets; and second and third panels of said liners aft from said dome include first and second respective rows of dilution holes.

11. A combustor according to claim 10 wherein said two rows of dilution holes divide said combustor into a primary zone between said dome and first row, an intermediate zone between said first and second rows, and an aft zone between said second row and combustor outlet, and said primary zone has maximum volume, and said intermediate zone has minimum volume.

12. A combustor according to claim 11 wherein:

said primary zone is configured for receiving combustion air primarily only from a row of said swirl cups in said dome;

said first row of dilution holes is sized to dilute combustion gases to a lean condition; and said second row of dilution holes is sized to quench said lean combustion gases.

13. A gas turbine engine combustor comprising:

radially outer and inner annular liners joined at forward ends to an annular dome and spaced radially apart at aft ends to define an annular outlet;

each of said liners including first and second respective rows of dilution holes axially spaced apart between said dome and said outlet;

a swirl cup mounted to said dome and including a flare cone extending through said dome with an obtuse first flare angle for discharging fuel in a wide spray from an outlet thereof;

a flared heat shield having a tubular inlet end surrounding said flare cone and extending in major part aft from said outlet thereof with an obtuse second flare angle offset forwardly from said first flare angle to define a radially outwardly facing step protruding said cone outlet axially aft between said first and second flare angles thereof; and said flare cone and heat shield being discrete components unattached at said step to permit unrestrained differential movement therebetween.

14. A combustor according to claim 13 wherein said heat shield has an obtuse flare angle.

15. A combustor according to claim 14 wherein said two rows of dilution holes divide said combustor into a primary zone between said dome and first row, an intermediate zone between said first and second rows, and an aft zone between said second row and combustor outlet, and said primary zone has maximum volume, and said intermediate zone has minimum volume.

16. A combustor according to claim 15 wherein said flare cone and heat shield at said step are imperforate in section to prevent airflow to said step.

17. A combustor according to claim 16 wherein flare cone and heat shield are parallel and axially offset from each other along said first and second flare angles.

18. A combustor according to claim 17 wherein said heat shield includes an aft perimeter having radially opposite border edges, and circumferentially opposite lateral edges, and said lateral edges are rolled forward to adjoin said dome and restrict airflow therebetween.

19. A combustor according to claim 18 wherein said heat shield border edges are rolled aft toward said outer and inner liners.

20. A combustor according to claim 19 wherein:

said flare angles of both said flare cone and heat shield are greater than about 100°; and each of said outer and inner liners includes five annular panels axially joined together at film cooling nuggets, with said first and second rows of dilution holes being disposed in second and third panels thereof.

* * * * *